United States Patent
Takamatsu

(10) Patent No.: US 10,520,799 B2
(45) Date of Patent: Dec. 31, 2019

(54) LIGHT SOURCE APPARATUS AND PROJECTOR WITH ROTOR COOLING MECHANISM

(71) Applicant: SONY CORPORATION, Tokyo (JP)

(72) Inventor: Takashi Takamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 8 days.

(21) Appl. No.: 15/541,071

(22) PCT Filed: Nov. 30, 2015

(86) PCT No.: PCT/JP2015/005942
§ 371 (c)(1),
(2) Date: Jun. 30, 2017

(87) PCT Pub. No.: WO2016/116979
PCT Pub. Date: Jul. 28, 2016

(65) Prior Publication Data
US 2018/0017854 A1    Jan. 18, 2018

(30) Foreign Application Priority Data

Jan. 20, 2015   (JP) ................................. 2015-008921

(51) Int. Cl.
*G03B 21/16*     (2006.01)
*F21V 9/30*      (2018.01)
(Continued)

(52) U.S. Cl.
CPC ............... *G03B 21/16* (2013.01); *F21V 9/30* (2018.02); *F21V 29/502* (2015.01); *F21V 29/67* (2015.01);
(Continued)

(58) Field of Classification Search
CPC ........ F21S 2/00; F21V 29/502; F21V 29/504; F21V 29/67; F21V 5/00; F21V 9/16;
(Continued)

(56) References Cited

U.S. PATENT DOCUMENTS

| | | | |
|---|---|---|---|
| 2006/0170876 A1 | 8/2006 | Takemi et al. | |
| 2012/0013854 A1* | 1/2012 | Nishimura | G03B 21/16 353/57 |

(Continued)

FOREIGN PATENT DOCUMENTS

| | | | |
|---|---|---|---|
| JP | 2004-053692 A | 2/2004 | |
| JP | 2006-215209 A | 8/2006 | |

(Continued)

OTHER PUBLICATIONS

International Search Report and Written Opinion of PCT Application No. PCT/JP2015/005942, dated Feb. 9, 2016, 02 pages of English Translation and 08 pages of ISRWO.

*Primary Examiner* — Cara E Rakowski
*Assistant Examiner* — Magda Cruz
(74) *Attorney, Agent, or Firm* — Chip Law Group

(57) ABSTRACT

[Solving Means] A light source apparatus includes a light source unit, a rotor, and a ventilation structure. The light source unit includes a light source, an optical device that collects light from the light source at a light collecting position, and a housing having an opening at the light collecting position that houses the light source and the optical device. The rotor has a wavelength conversion region that is arranged on a light irradiation region which is irradiated with light, the light being collected at the light collecting position and emitted outside the housing via the opening, the rotor being disposed rotatably about a rotation axis. In the ventilation passage, at least a part of the rotor is arranged.

11 Claims, 6 Drawing Sheets

(51) Int. Cl.
*H04N 5/74* (2006.01)
*F21V 29/67* (2015.01)
*F21V 29/502* (2015.01)
*G03B 21/20* (2006.01)
*H04N 9/31* (2006.01)

(52) U.S. Cl.
CPC .......... *G03B 21/204* (2013.01); *H04N 5/74* (2013.01); *H04N 9/315* (2013.01); *G03B 21/2013* (2013.01)

(58) Field of Classification Search
CPC ........ G03B 21/00; G03B 21/14; G03B 21/16; H04N 5/74
See application file for complete search history.

(56) References Cited

U.S. PATENT DOCUMENTS

| | | | | |
|---|---|---|---|---|
| 2016/0053981 A1* | 2/2016 | Terasaki | ................ | G03B 21/16 353/57 |
| 2016/0103387 A1* | 4/2016 | Nishimori | .............. | G03B 21/16 353/38 |

FOREIGN PATENT DOCUMENTS

| | | | |
|---|---|---|---|
| JP | 2007-093690 | A | 4/2007 |
| JP | 2007-171388 | A | 7/2007 |
| JP | 2007-256451 | A | 10/2007 |
| JP | 2012-018762 | A | 1/2012 |
| JP | 2014-010181 | A | 1/2014 |
| WO | 2014/196126 | A1 | 12/2014 |

\* cited by examiner

LIGHT SOURCE APPARATUS AND PROJECTOR WITH ROTOR COOLING MECHANISM

CROSS REFERENCE TO RELATED APPLICATIONS

This application is a U.S. National Phase of International Patent Application No. PCT/JP2015/005942 filed on Nov. 30, 2015, which claims priority benefit of Japanese Patent Application No. JP 2015-008921 filed in the Japan Patent Office on Jan. 20, 2015. Each of the above-referenced applications is hereby incorporated herein by reference in its entirety.

TECHNICAL FIELD

The present technology relates to a light source apparatus and a projector including the same.

BACKGROUND ART

A light source apparatus of a projector described in Patent Literature 1 is a type of a light source apparatus including a phosphor wheel having a substrate that is rotatable about a predetermined rotation axis and a phosphor layer including phosphor disposed on the substrate, and irradiating the phosphor wheel with light to provide fluorescence light. The light source apparatus includes a light source, a light collecting optical system that irradiates the phosphor layer with excited light emitted from the light source so as to collect the excited light on the phosphor layer, and a casing having a closed space that houses the phosphor wheel and is shut off from outside. Thus, the phosphor wheel is housed in the closed space to prevent dust from directly attaching to the phosphor layer (for example, see paragraphs [0006], [0017] of specification of Patent Literature 1).

CITATION LIST

Patent Literature

Patent Literature 1: Japanese Patent Application Laid-open No. 2012-18762

DISCLOSURE OF INVENTION

Technical Problem

In the light source apparatus of Patent Literature 1, the phosphor wheel is housed in the closed space. Therefore, there is a problem that heat from the light source is easily accumulated in the closed space. In order to solve the heat problem, the light source apparatus adopts a structure that a heat radiation fin is formed at an outer periphery of the casing, or a structure that vanes for flowing air in the closed space are formed on the substrate of the phosphor wheel. However, it is difficult to efficiently cool the phosphor wheel arranged in the closed space.

The present technology is made in view of the above-mentioned circumstances, and it is an object of the present technology to provide a light source apparatus that can efficiently cool a rotor and a projector including the same.

Solution to Problem

In order to achieve the object, a light source apparatus according to the present technology includes a light source unit, a rotor, and a ventilation structure.

The light source unit includes a light source, an optical device that collects light from the light source at a light collecting position, and a housing having an opening at the light collecting position that houses the light source and the optical device.

The rotor has a wavelength conversion region that is arranged on a light irradiation region which is irradiated with light, the light being collected at the light collecting position and emitted outside the housing via the opening, the rotor being disposed rotatably about a rotation axis.

In the ventilation passage, at least a part of the rotor is arranged.

In the light source apparatus, the wavelength conversion region, which is arranged on the light irradiation region for the rotor, is arranged outside the housing of the light source unit, and at least a part of the rotor is arranged in the ventilation passage. Specifically, since cooling air is supplied to the rotor in the ventilation passage, the rotor is efficiently cooled. In addition, since no air is supplied to the housing, dust can be prevented from entering the housing.

The ventilation passage may be formed such that cooling air is supplied to a region of the rotor different from the light irradiation region.

The optical components are arranged in the vicinity of the light irradiation region and the light emitting region at an opposite side thereof. Since the cooling air is supplied to the wheel region different from these regions, dust can be prevented from attaching to the optical components.

The ventilation passage may be formed such that an amount of air flowing through a space facing to at least a part of the region of the rotor is largest, the region having an angle of rotation of 90° to 270° from the light irradiation region about the rotation axis.

The ventilation passage may be formed such that an amount of air flowing through a space facing to a region opposite to the light irradiation region about the rotation axis is largest.

The light source apparatus may further includes a lens unit into which light emitted from the light irradiation region enters. A part of the lens unit may be structured as a part of a ventilation structure that forms the ventilation passage.

With this structure, the ventilation structure having small flow resistance at a rotor region distant from the light irradiation region and the light emitting region using the lens unit can be structured.

The ventilation passage is formed such that the cooling air is supplied along a rotation direction of the rotor.

With this structure, a turbulence flow can be prevented from occurring.

A part of the housing may be structured as a part of the ventilation structure that forms the ventilation passage.

The ventilation passage may be formed linearly from a front to a back of a region, the region being at least a part of the rotor to which the cooling air is supplied.

With this structure, air flow resistance can be decreased.

The light source apparatus may further includes a light diffuser arranged to face to the opening or arranged within the opening.

With the light diffuser being arranged, light having uniform illuminance can be emitted from the housing of the light source unit.

The rotor may include a first surface at a side which the light enters and a second surface opposite to the first surface. The ventilation passage may be formed such that a width of a part of the ventilation passage at a side of the second surface in a direction of the rotation axis is greater than a width of a part of the ventilation passage at a side of the first surface in the direction of the rotation axis.

The lens unit may be attachable and detachable to the ventilation structure.

With this structure, the lens unit 10 can be easily maintained, replaced, and the like. In addition, the ventilation passage 31a can be easily cleaned by removing the lens unit 10.

A projector according to the present technology includes a light source unit including a light source, an optical device that collects light from the light source at a light collecting position, and a housing having an opening at the light collecting position that houses the light source and the optical device, a rotor having a wavelength conversion region that is arranged on a light irradiation region which is irradiated with light, the light being collected at the light collecting position and emitted outside the housing via the opening, the rotor being disposed rotatably about a rotation axis, a ventilation passage in which at least a part of the rotor is arranged, a fan that supplies the ventilation passage with cooling air, a light modulation element that modulates light emitted from the wavelength conversion region of the rotor, and a projection optical system that projects modulated light obtained by modulation of the light modulation element.

Advantageous Effects of Invention

As described above, according to the present technology, the rotor can be efficiently cooled.

Note that effects described herein are not limited only to be illustrative, there may be effects other than those described herein.

MODE(S) FOR CARRYING OUT THE INVENTION

Hereinafter, embodiments of the present technology will be described with reference to the drawings.

[Light Source Apparatus]

Figure 1:
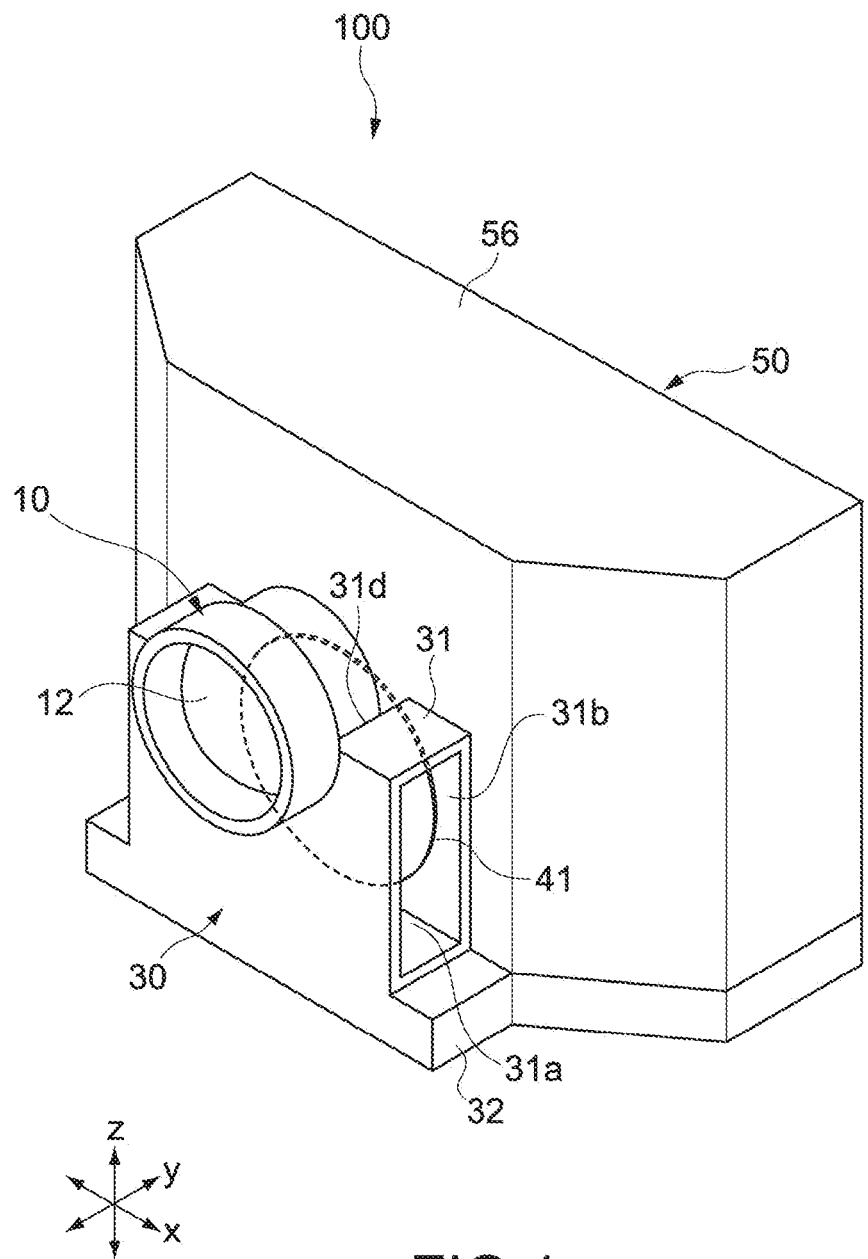
FIG. 1 is a perspective view showing a light source apparatus according to an embodiment of the present technology.

FIG. 1 is a perspective view showing a light source apparatus according to an embodiment of the present technology. The light source apparatus 100 includes a light source unit 50, a wheel 41 as a rotor rotatably about a rotation axis, light from the light source unit 50 entering the wheel 41, the wheel 41 emitting light having a desirable wavelength region, a lens unit 10 that takes out the light emitted from the wheel 41 outside the light source apparatus 100, and a ventilation structure 30 arranged on the light source unit 50.

Hereinafter, for convenience of description, a light axis of the lens unit 10 is defined as a main light axis, and the direction along the main light axis is defined as the y direction. In addition, two axes orthogonal to the y axis are defined as x and z axes.

Figure 2:
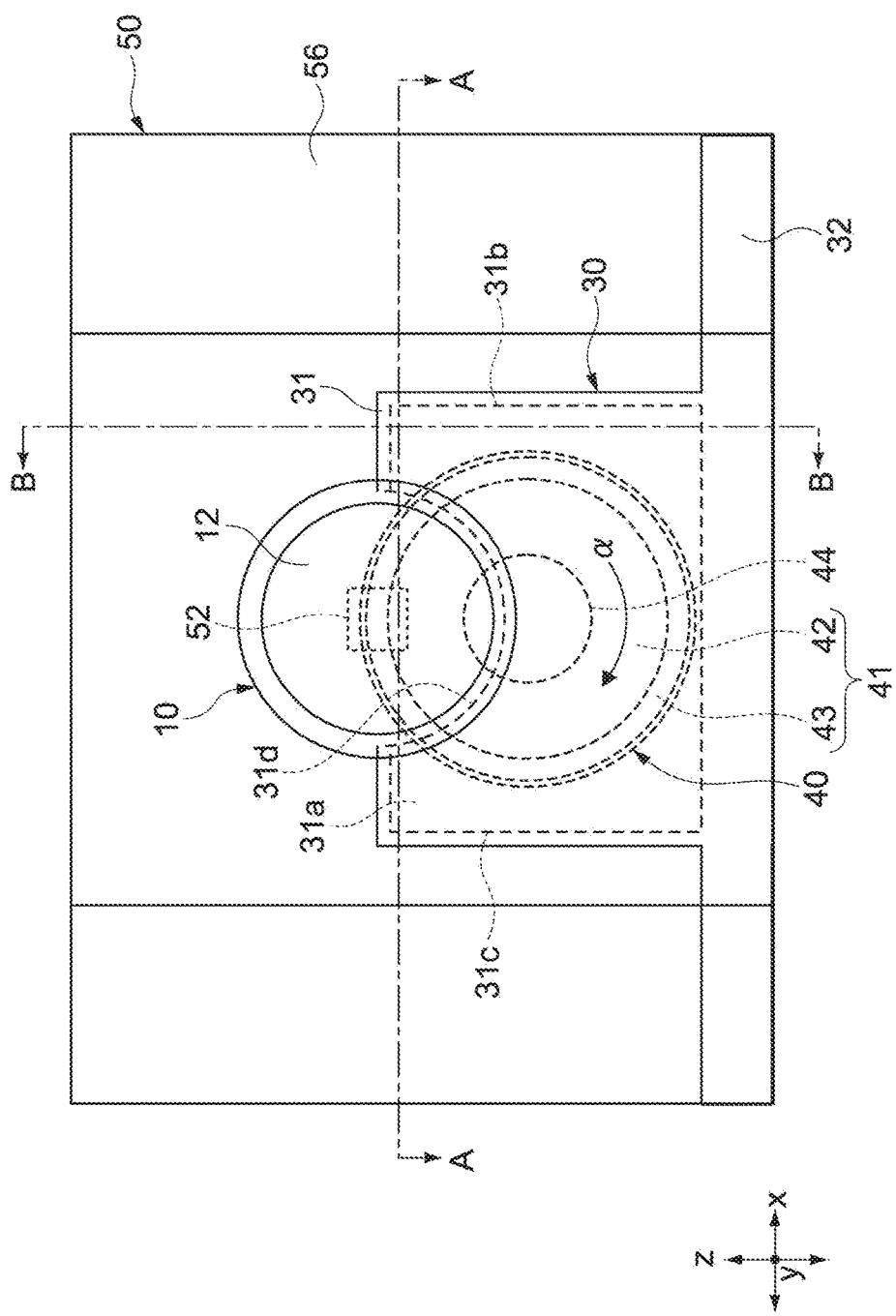
FIG. 2 is a front view showing the light source apparatus shown in FIG. 1 viewed in the y direction.
Figure 3:
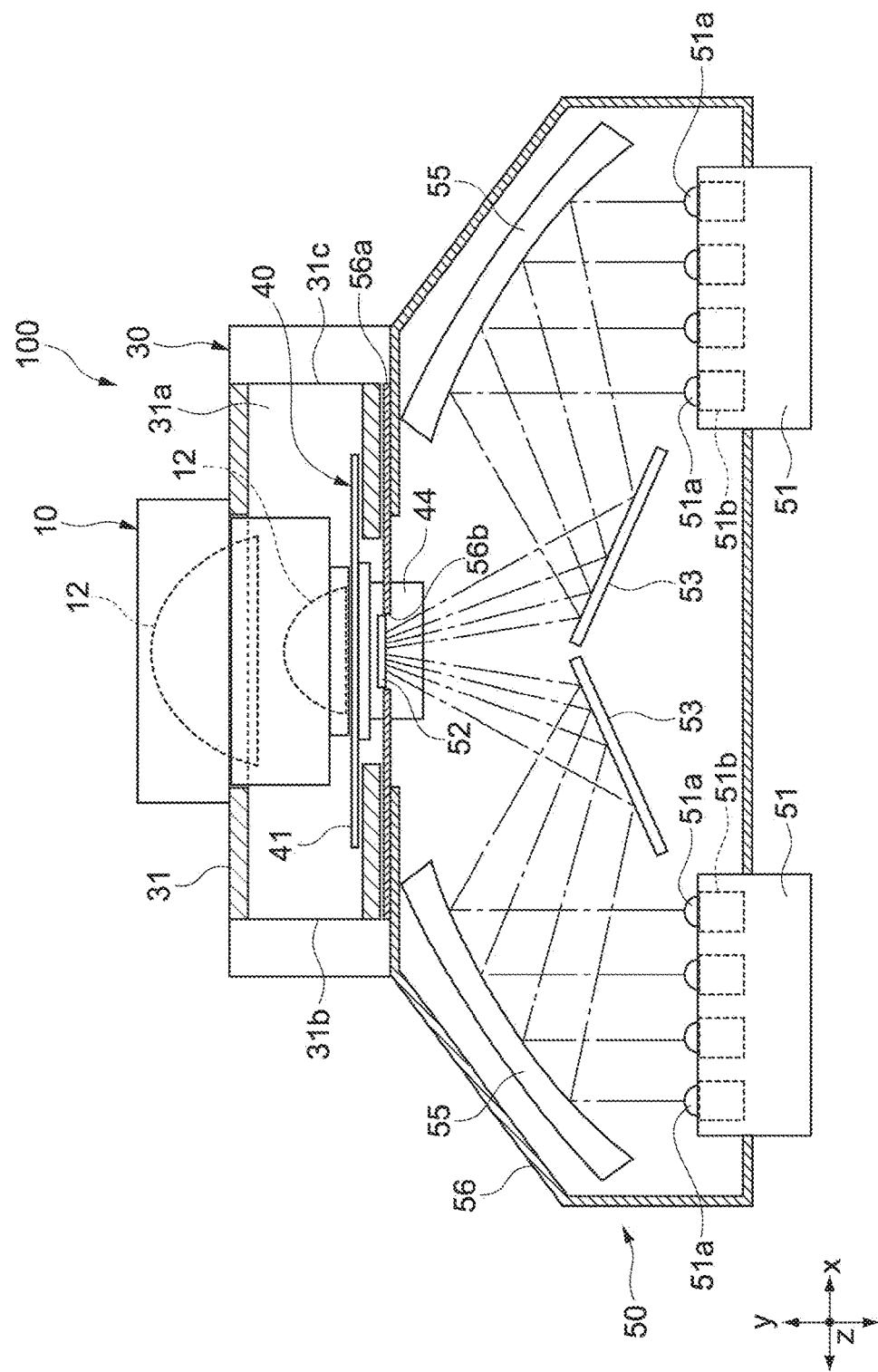
FIG. 3 is a partial sectional view taken along the line A-A of FIG. 2.
Figure 4:
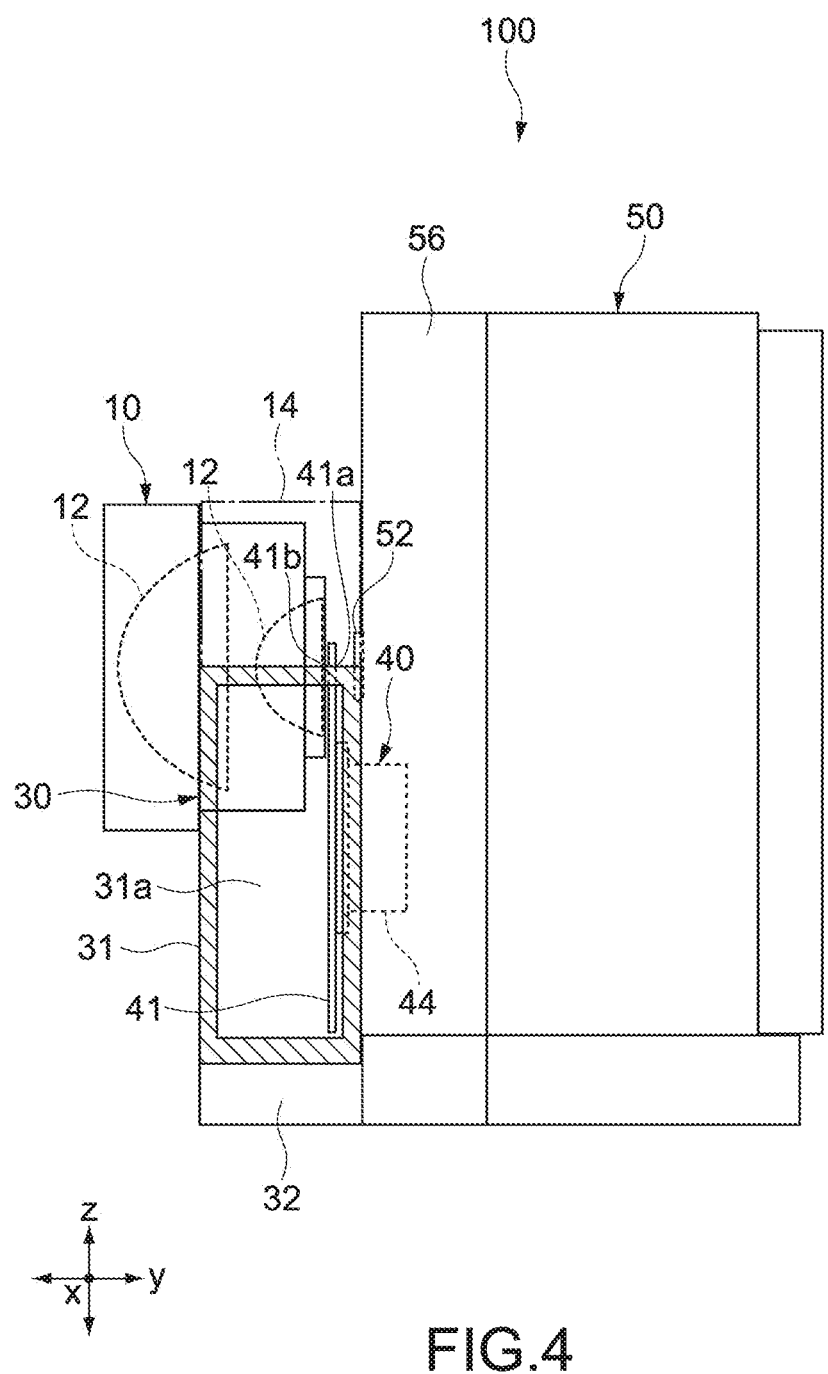
FIG. 4 is a partial sectional view taken along the line B-B of FIG. 2.

FIG. 2 is a front view showing the light source apparatus 100 viewed in the y direction. FIG. 3 is a partial sectional view taken along the line A-A of FIG. 2. FIG. 4 is a partial sectional view taken along the line B-B of FIG. 2.

The light source unit 50 includes a housing 56, and includes a main optical system in the housing 56. As shown in FIG. 3, the housing 56 has a roughly trapezoid shape viewed in the z direction. The housing 56 includes a plurality of light sources 51a and an optical device (the plurality of optical devices may be possible) that collects light from the light sources 51a on a predetermined light collecting position.

For example, the light source unit 50 includes two light source assemblies 51. The two light source assemblies 51 are arranged at line-symmetric positions about the main light axis in the y direction. Each one of the light source assemblies 51 includes the plurality of light sources 51a arranged in a matrix and substrates 51b on which the plurality of light sources 51a are mounted, respectively. As the light source 51a, a blue laser light source is used, for example. The light source assemblies 51 are attached to the housing 56 such that a plane on which the light sources 51a are arranged is on the x-z plane.

Also, for convenience of description, in the light source apparatus 100 in the y direction, a side on which the lens unit 10 is arranged is defined as a front part or a front surface, and a side on which the light source assemblies 51 are arranged is defined as a back part or a rear surface.

The light source assemblies 51 may be used as members constituting a part of a back part side of the housing 56. A heat sink such as a heat releasing fin (not shown) may be connected to a back part side of each light source assembly 51. In this case, this heat sink may constitute a part or all of the back part side of the housing 56.

As the optical devices in the housing 56, aspherical mirrors 55 and plane mirrors 53 are provided. The aspherical mirror 55 reflects the light emitted from each light sources 51a toward the plane mirror 53. The plane mirror 53 reflects the light from the aspherical mirror 55 toward the above-described predetermined light collecting position. The two aspherical mirrors 55 and the two plane mirrors 53 are provided, and are arranged at the line-symmetric positions about the main light axis in accordance with the arrangement of the light source assemblies 51.

A front cover plate 56a arranged on a front part of the housing 56 has an opening 56b arranged at the light collecting position. The light reflected by the plane mirrors 53 is supplied to the outside the housing 56 via the opening 56b. For example, a light diffuser (hereinafter simply referred to as "diffuser") 52 is arranged so as to cover the opening 56b. The diffuser 52 has a function to diffuse the entering light and generate the light having uniform illuminance.

The diffuser 52 may be attached to the front cover plate 56a, or may be attached to the housing 56 via an attachment member (not shown). Alternatively, the diffuser 52 may be attached to the front cover plate 56a such that the diffuser 52 is fitted into the opening 56b, or may be attached to the front cover plate 56a inside the housing 56.

As shown in FIGS. 3 and 4, the lens unit 10 is arranged at the position facing to the diffuser 52. In this embodiment, the lens unit 10 is arranged such that the light axis (main light axis) of the lens unit 10 passes through the center of the diffuser 52. The lens unit 10 includes a plurality of lenses 12, for example, in a lens housing, and structures a collimating optical system.

The wheel 41 is arranged outside the housing 56 and between the diffuser 52 and the lens unit 10. The wheel 41 is connected to a motor 44 that rotates the wheel 41, and the wheel 41 and the motor 44 structure a wheel unit 40. The wheel unit 40 is arranged such that the rotation axis of the motor 44 is in the y direction.

As shown in FIG. 2, the wheel 41 includes a disc-shaped glass substrate 42, for example. The wheel 41 (glass substrate 42) includes a first surface at a rear surface side which the light emitted from the diffuser 52 enters (which is irradiated with the light) and a second surface at a front surface side opposite to the first surface. The wheel 41 includes a phosphor 43 formed circularly at the second surface side.

As shown in FIGS. 3 and 4, the wheel unit 40 is arranged such that the main light axis passes through a part of a circular region of the wheel 41 on which the phosphor 43 is formed. For example, in this embodiment, the wheel unit 40 is arranged such that the main light axis passes through the highest position in the z direction of the circular region of the wheel 41 on which the phosphor 43 is formed.

As described above, the light emitted from the diffuser 52 enters the first surface of the glass substrate 42. The entering light passes through the glass substrate 42 and enters the phosphor 43, and the phosphor 43 emits white light. The glass substrate 42 has a light irradiation region 41*a* including a region through which the main light axis passes at a side opposite to the phosphor 43, and a light emitting region 41*b* including a region of the phosphor 43 which the light enters and the proximity (see FIG. 4).

Specifically, by exciting the phosphor 43 with a part of blue laser light as exciting light, the phosphor 43 generates blue light and yellow light, and blue light and yellow light are synthesized to generate white light. In other words, the phosphor 43 functions as a light wavelength conversion region.

Note that the motor 44 may be fixed by a fixing member (not shown) connecting to the housing 56. Alternatively, the motor 44 may be connected to a member constituting the ventilation structure 30.

The ventilation structure 30 has a ventilation passage unit 31 arranged outside the housing 56 on the front part. The ventilation structure 30 is formed such that the wheel 41 is arranged in a ventilation passage 31*a* formed in the ventilation passage unit 31. The ventilation structure 30 includes an inlet 31*b* for cooling air and an outlet 31*c* facing to the inlet 31*b*, and the ventilation passage 31*a* is formed linearly from the inlet 31*b* to the outlet 31*c* (from a front to a back of a region, the region being at least a part of the rotor to which the cooling air is supplied). With this structure, air flow resistance can be decreased.

The ventilation passage 31*a* is a void zone formed along the surfaces of the wheel 41 (above-described first surface and second surface) in a longitudinal direction (x direction). The ventilation passage unit 31 has a cut-out portion 31*d* in the upper part. The cut-out portion 31*d* is open, and the lens unit 10 is arranged on the cut-out portion 31*d* and is disposed to close the opening. Specifically, a part of the lens unit 10 is structured as a part of the ventilation structure 30 that forms the ventilation passage 31*a*.

Note that the ventilation structure 30 has a bottom plate 32 formed integrally with the ventilation passage unit 31. The bottom plate 32 is a member that structures all or a part of the bottom of the housing 56, for example, and is screwed and connected to other members of the housing 56. In other words, a part of the housing 56 is structured as a part of the ventilation structure 30 that forms the ventilation passage 31*a*. An individual ventilation passage unit 31 independent of the bottom plate 32 may be connected to the housing 56, or no bottom plate 32 may be provided.

Figure 6:
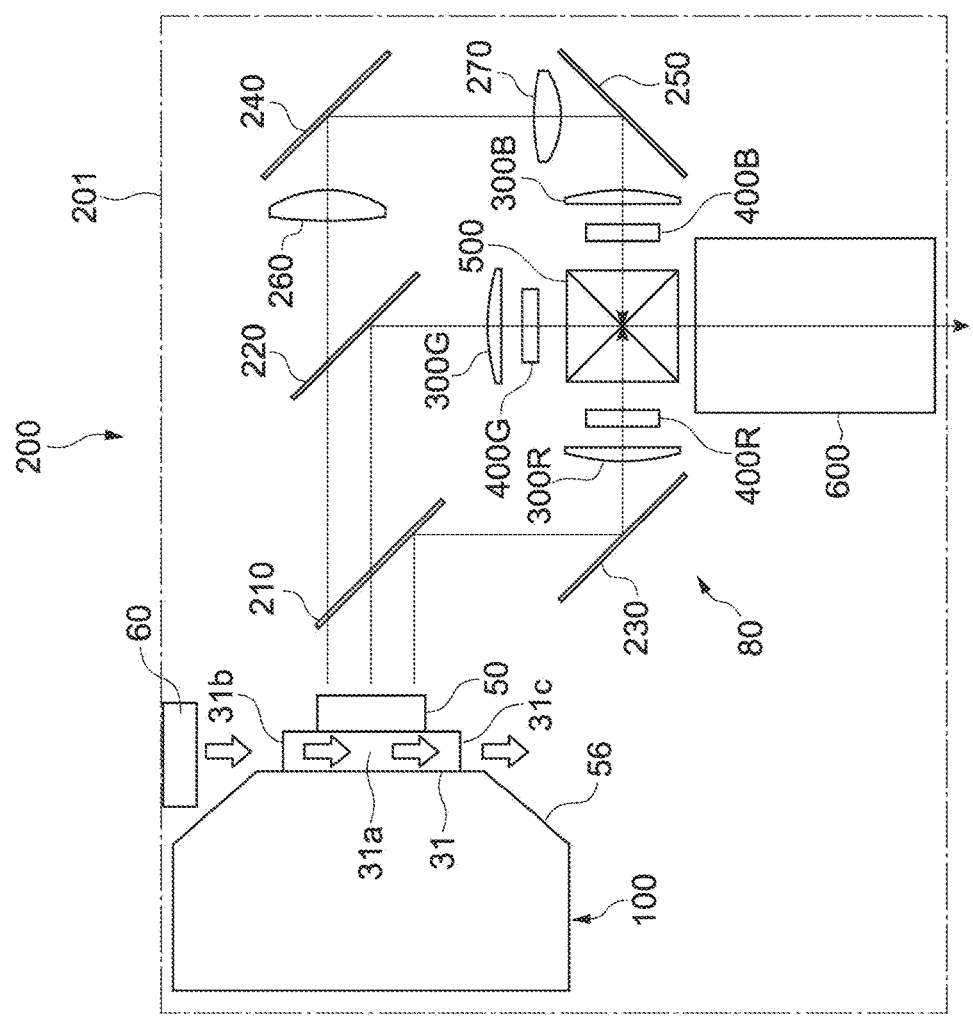
FIG. 6 shows a structure of an optical system of a projector using the light source apparatus.

As shown in FIG. 6, a fan 60 that supplies the ventilation passage 31*a* with air is disposed in the vicinity of the inlet 31*b* of the ventilation passage unit 31. FIG. 6 shows a structure of an optical system of a projector 200, which will be described later. The fan 60 is, for example, an axial-flow fan, but may be a centrifugal fan or other fans.

The fan 60 supplies the ventilation passage 31*a* with air (cooling air), which is supplied from an intake (not shown) disposed at an outer casing 201 of the projector 200, via the inlet 31*b*. The air passes through the ventilation passage 31*a*, cools the wheel 41, and is ejected from the outlet 31*c*. The air ejected from the outlet 31*c* is ejected from, for example, an exhaust (not shown) disposed at the bottom of the outer casing 201 or an exhaust accessible via a path (not shown).

As described above, a part of the lens unit 10 is structured as a part of the ventilation structure 30. Accordingly, as shown in FIGS. 2 and 4, the ventilation passage 31*a* is formed such that air is supplied to a wheel region (rotor region) of a region of the wheel 41 different from the light irradiation region (may be light emitting region).

Figure 5:
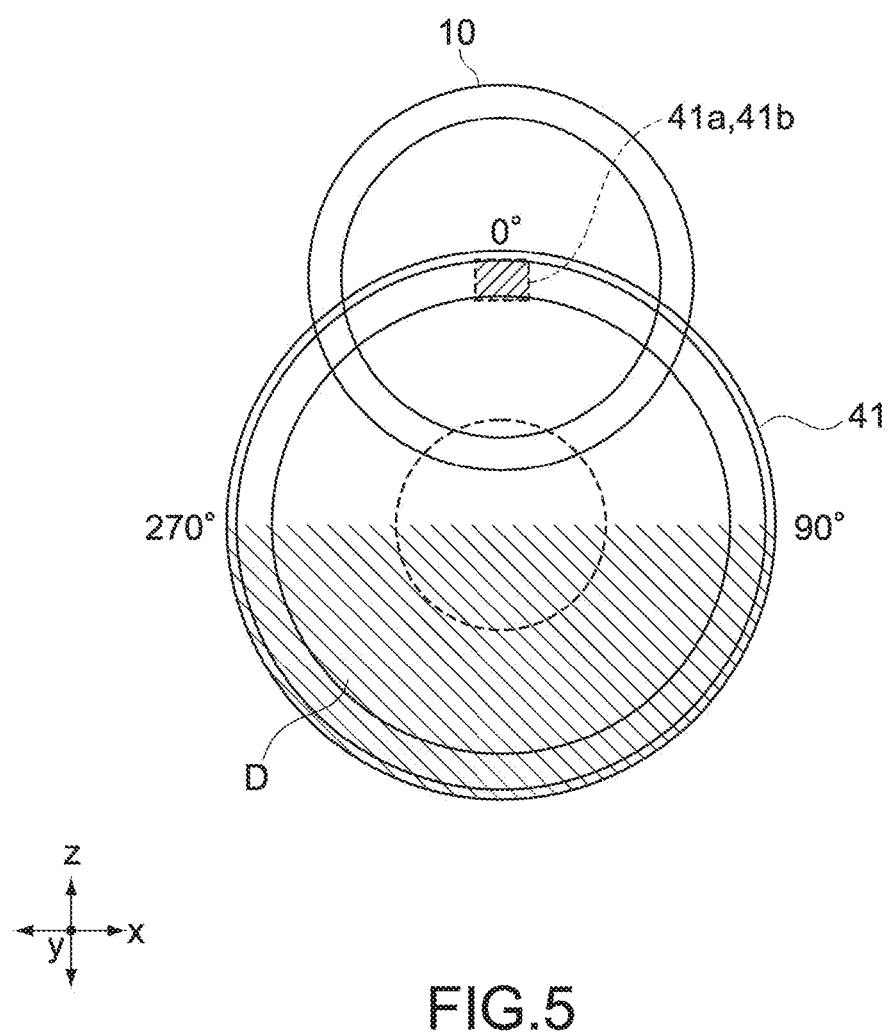
FIG. 5 is a diagram for illustrating an angle range of the wheel region where an amount of air flow is relatively large.

FIG. 5 is a diagram for illustrating an angle range of the wheel region where an amount of air flow is relatively large. For example, as shown by the hatching D, the ventilation passage 31*a* is formed such that the amount of air flowing through a space facing to at least a part of an approximately lower half region of the wheel 41 is largest.

Specifically, the ventilation passage 31*a* is formed such that an amount of air flowing through a space facing to at least a part of the region of the wheel region is largest, the region having an angle of rotation of 90° to 270° from the light irradiation region 41*a* about the rotation axis. In other words, the ventilation passage 31*a* is formed such that an amount of air flowing through at least a part of the region is largest, the region having an angle of rotation of 90° to 270° distant from the light irradiation region 41*a* or the light emitting region 41*b* in one direction, where a center position of an angle position of the light irradiation region 41*a* or the light emitting region 41*b* is 0°.

Preferably, the range is from 130° to 230°, or from 160° to 200°. Specifically, more preferably, the ventilation passage 31*a* is formed such that the amount of air flowing through the space facing to the light irradiation region 41*a* about the rotation axis is largest in the ventilation passage 31*a*.

The above-described ventilation passage 31*a* is attained by structuring a part of the lens unit 10 as a part of the ventilation structure 30, for example, as described above.

Thus, the optical components such as the diffuser 52 and the lens unit 10 are arranged in the vicinity of the light irradiation region and the light emitting region at an opposite side thereof. Since the cooling air is supplied to the wheel region different from the light irradiation region and the light emitting region, dust carried by the cooling air passes through the vicinity of the wheel region distant from these regions, and is ejected from the outlet 31*c*. Thus, the dust can be prevented from attaching to the diffuser 52 or the lenses 12 of the lens unit 10. In particular, the region in the vicinity of the diffuser 52 has a largest amount of light. In a case where dust is attached to the diffuser 52, the diffuser 52 may be seized up, and the optical property may be degraded. However, according to this embodiment, such a situation can be prevented.

In addition, since the ventilation passage 31a includes no optical components at a location distant from the light irradiation region and the light emitting region, flow resistance can be reduced. Thus, since air is supplied to the wheel region distant from the light irradiation region, the wheel 41 can be efficiently cooled.

As shown in FIG. 4, the ventilation passage 31a is formed such that a width of a part of the ventilation passage 31a at a side of the second surface in the y direction is greater than a width of a part of the ventilation passage 31a at a side of the first surface in the y direction. The diffuser 52 is arranged at the side of the first surface of the wheel 41, where the ventilation passage 31a at the side of the second surface side is formed wide, the amount of dust carried to the diffuser 52 can be as low as possible, and the dust can be prevented from attaching to the diffuser 52.

As shown in FIG. 2, where the light source apparatus 100 is seen from the front, the wheel 41 is rotated clockwise, for example. As described above, the ventilation passage 31a is formed and the fan 60 is arranged such that air is supplied along a rotation direction (shown by the arrow α) of the wheel 41 in the region having an angle of rotation of 90° to 270° from the light irradiation region, in particular, in the region having an angle of rotation of 180°. With this structure, a turbulence flow can be prevented from occurring, and the dust can be smoothly ejected from the outlet 31c.

The lens unit 10 is attachable and detachable to the housing 56 and/or the ventilation passage unit 31. For example, as described above, the lens unit 10 is placed to be engaged with the cut-out portion 31d of the upper part of the ventilation passage unit 31, and is mounted to the ventilation passage unit 31. The attachable and detachable means may be, for example, screws or other engagement structures. Note that, as shown in FIG. 4, a attachable and detachable cover 14 is attached to the upper part of the lens unit 10.

Since the lens unit 10 is structured to be attachable and detachable, the lens unit 10 can be easily maintained, replaced, and the like. In addition, the ventilation passage 31a can be easily cleaned by removing the lens unit 10.

Furthermore, since the ventilation passage unit 31 has the cut-out portion 31d and the lens unit 10 is mounted to be engaged with the cut-out portion 31d, positioning is easily performed when the lens unit is mounted.

[Projector]

FIG. 6 shows a structure of an optical system of a projector 200 using the light source apparatus 100. The projector 200 includes the light source apparatus 100 and an optical engine 80 that generates image light using light emitted from the light source apparatus 100.

(Structure of Optical Engine)

The optical engine 80 includes dichroic mirrors 210 and 220, mirrors 230, 240, and 250, relay lenses 260 and 270, field lenses 300R, 300G, and 300B, liquid-crystal light valves 400R, 400G, and 400B as light modulation elements, a dichroic prism 500, and a projection optical system 600.

The dichroic mirrors 210 and 220 have properties that selectively reflect color light of a predetermined wavelength region and transmit light of other wavelength regions. For example, the dichroic mirror 210 selectively reflects red light. The dichroic mirror 220 selectively reflects green light of green light and blue light transmitted through the dichroic mirror 210. The remaining blue light is transmitted through the dichroic mirror 220. With this, the light emitted from the light source apparatus 100 is separated into light beams having a plurality of different colors.

The red light reflected by the dichroic mirror 210 is reflected by the mirror 230, is collimated by passing through a field lens 300R, and then enters a liquid-crystal light valve 400R for modulating the red light. The green light reflected by the dichroic mirror 220 is collimated by passing through the field lens 300G, and then enters a liquid-crystal light valve 400G for modulating the green light. The blue light transmitted through the dichroic mirror 220 passes through the relay lens 260, is reflected by the mirror 240, further passes through the relay lens 270, and is reflected by the mirror 250. The blue light reflected by the mirror 250 is collimated by passing through a field lens 300B, and then enters a liquid-crystal light valve 400B for modulating the blue light.

The liquid-crystal light valves 400R, 400G, and 400B are electrically connected to a signal source (not shown) (e.g., PC) that feeds an image signal including image information. The liquid-crystal light valves 400R, 400G, and 400B modulate the entering light for each pixel on the basis of an image signal of each color, and generate a red image, a green image, and a blue image, respectively. The image light of each color obtained by the modulation (modulation light) enters the dichroic prism 500 and is combined. The dichroic prism 500 overlaps and combines the light beams of the respective colors entering in three directions, and emits the light to the projection optical system 600.

The projection optical system 600 irradiates the combined light by the dichroic prism 500 to a screen (not shown). With this, a full color image is displayed.

As described above, the fan 60 is arranged in the vicinity of the ventilation passage unit 31 of the light source apparatus 100. The fan 60 supplies the ventilation passage 31a with air supplied, for example, from outside the outer casing 201 of the projector 200. The outer casing 201 can be designed to have any shape.

[Various Other Embodiments]

The present technology is not limited to the above-described embodiments, and various other embodiments may be realized.

The ventilation passage unit 31 according to this embodiment is structured so as to house at least a lower half of the wheel 41. However, the ventilation passage unit 31 may be structured so as to house a smaller wheel region.

In addition, the ventilation passage unit 31 according to this embodiment has the cut-out portion 31d, and a part of the lens unit 10 structures a part of the ventilation passage unit 31. However, the lens unit 10 may be disposed independently from the ventilation structure. For example, a ventilation passage unit having no cut-out portion that forms a ventilation passage having a volume smaller than that of the above-described embodiment may be arranged independently at a bottom part of the lens unit 10 (so as to house the lower half of the wheel region).

In the above-described embodiment, the diffuser 52 is attached to the housing 56, but may be built in the lens unit, for example, as a part of the lens unit. In this case, so as not to interfere the wheel 41 with the lens unit, a slit is formed in the lens unit in order to enter a part of the wheel 41 into the lens unit.

As the wavelength conversion region disposed at the wheel 41, not the phosphor 43 but a color filter that is used in a color wheel may be used. An outer shape of the wheel 41 is not limited to circular, and may be a rotationally symmetric shape such as a regular polygon.

The light source 51a according to the above-described embodiment is a laser light source, but may be an LED (Light Emitting Diode). In this case, other optical system is disposed to collect light from the LED light source on the phosphor 43 of the wheel 41.

The shape and the structure of the housing 56 of the light source unit 50 are not limited to the above. Various design changes may be made on the housing 56. For example, the housing 56 is substantially sealed in the above-described embodiment, but may be partly open.

There is no need to dispose the plurality of light source assemblies 51 as described in the above embodiment, and one light source assembly 51 may be disposed.

The optical device for collecting light between the light sources 51a and the diffuser 52 is not limited to that described in the above embodiment. As one of the optical devices for collecting light, a single optical device may be used, or other optical devices such as prism may be used.

As the light modulation elements of the projector 200 according to the above-described embodiment, a liquid crystal device is used. A DMD (Digital Micro-mirror Device) may be used instead.

Among the features of each embodiment described above, at least two features may be combined.

Note that the present technology may also have the following configurations.

(1) A light source apparatus, including:
a light source unit including a light source, an optical device that collects light from the light source at a light collecting position, and a housing having an opening at the light collecting position that houses the light source and the optical device;
a rotor having a wavelength conversion region that is arranged on a light irradiation region which is irradiated with light, the light being collected at the light collecting position and emitted outside the housing via the opening, the rotor being disposed rotatably about a rotation axis; and
a ventilation passage in which at least a part of the rotor is arranged.

(2) The light source apparatus according to (1), in which
the ventilation passage is formed such that cooling air is supplied to a region of the rotor different from the light irradiation region.

(3) The light source apparatus according to (2), in which
the ventilation passage is formed such that an amount of air flowing through a space facing to at least a part of the region of the rotor is largest, the region having an angle of rotation of 90° to 270° from the light irradiation region about the rotation axis.

(4) The light source apparatus according to (2), in which
the ventilation passage is formed such that an amount of air flowing through a space facing to a region opposite to the light irradiation region about the rotation axis is largest.

(5) The light source apparatus according to any one of (2) to (4), further including:
a lens unit into which light emitted from the light irradiation region enters,
a part of the lens unit being structured as a part of a ventilation structure that forms the ventilation passage.

(6) The light source apparatus according to any one of (2) to (5), in which
the ventilation passage is formed such that the cooling air is supplied along a rotation direction of the rotor.

(7) The light source apparatus according to any one of (1) to (6), in which
a part of the housing is structured as a part of the ventilation structure that forms the ventilation passage.

(8) The light source apparatus according to any one of (2) to (7), in which
the ventilation passage is formed linearly from a front to a back of a region, the region being at least a part of the rotor to which the cooling air is supplied.

(9) The light source apparatus according to any one of (1) to (8), further including:
a light diffuser arranged to face to the opening or arranged within the opening.

(10) The light source apparatus according to any one of (1) to (9), in which
the rotor includes a first surface at a side which the light enters and a second surface opposite to the first surface, and
the ventilation passage is formed such that a width of a part of the ventilation passage at a side of the second surface in a direction of the rotation axis is greater than a width of a part of the ventilation passage at a side of the first surface in the direction of the rotation axis.

(11) The light source apparatus according to (5), in which
the lens unit is structured to be attachable and detachable to the ventilation structure.

(12) A projector, including:
a light source unit including a light source, an optical device that collects light from the light source at a light collecting position, and a housing having an opening at the light collecting position that houses the light source and the optical device;
a rotor having a wavelength conversion region that is arranged on a light irradiation region which is irradiated with light, the light being collected at the light collecting position and emitted outside the housing via the opening, the rotor being disposed rotatably about a rotation axis;
a ventilation passage in which at least a part of the rotor is arranged;
a fan that supplies the ventilation passage with cooling air;
a light modulation element that modulates light emitted from the wavelength conversion region of the rotor; and
a projection optical system that projects modulated light obtained by modulation of the light modulation element.

REFERENCE SIGNS LIST 10 lens unit
30 ventilation structure
31 ventilation passage unit
31a ventilation passage
31b inlet
31c outlet
40 wheel unit
41 wheel
42 glass substrate
43 phosphor
50 light source unit
51 light source assembly
51a light source
51b substrate
52 diffuser
53 plane mirror 55 aspherical mirror
56 housing
56a front cover plate
56b opening
60 fan
80 optical engine
100 light source apparatus
200 projector
201 outer casing
400R, 400G, 400B crystal liquid light valve
600 projection optical system

The invention claimed is:

1. A light source apparatus, comprising:
    a light source unit that comprises:
        a housing, wherein the housing comprises an opening at a light collecting position;
        a light source inside the housing, wherein the light source is configured to irradiate a light irradiation region; and
        an optical device configured to collect light, via the opening, from the light source at the light collecting position;
    a rotor that is rotatable about a rotation axis, wherein the rotor comprises a wavelength conversion region that is on the light irradiation region, wherein the wavelength conversion region is configured to convert a wavelength of the light collected from the light source;
    a ventilation passage, wherein at least a part of the rotor is inside the ventilation passage; and
    a lens unit, wherein
        a part of the lens unit forms a first part of a ventilation structure, and
        the ventilation structure forms the ventilation passage.

2. The light source apparatus according to claim 1, further comprising a fan configured to supply cooling air, to a first region of the rotor, via the ventilation passage,
    wherein the first region is different from the light irradiation region.

3. The light source apparatus according to claim 2, wherein
    a specific amount of air is flowable via a space,
    the space faces at least a part of the first region of the rotor, and
    the first region is at an angle of rotation of 90° to 270°, from the light irradiation region, about the rotation axis.

4. The light source apparatus according to claim 2, wherein
    a specific amount of air is flowable via a space,
    the space faces a second region, and
    the second region is opposite to the light irradiation region about the rotation axis.

5. The light source apparatus according to claim 2, wherein the ventilation passage is formed such that the cooling air is supplied along a rotation direction of the rotor.

6. The light source apparatus according to claim 2, wherein the ventilation passage is a linear passage from a front to a back of the first region.

7. The light source apparatus according to claim 1, wherein a part of the housing forms a second part of the ventilation structure, and
    wherein the second part of the ventilation structure forms the ventilation passage.

8. The light source apparatus according to claim 1, further comprising a light diffuser that faces or is in the opening.

9. The light source apparatus according to claim 1, wherein
    the rotor further comprises a first surface and a second surface that is opposite to the first surface,
    the first surface is on a first side of the rotor,
    a first width in a direction of the rotation axis is greater than a second width in the direction of the rotation axis,
    the first width is of a part of the ventilation passage at a second side of the second surface, and
    the second width is of a part of the ventilation passage at a third side of the first surface.

10. The light source apparatus according to claim 1, wherein the lens unit is detachable from the ventilation structure.

11. A projector, comprising:
    a light source unit that comprises:
        a housing, wherein the housing comprises:
            an opening at a light collecting position;
            a light source inside the housing, wherein the light source is configured to irradiate a light irradiation region; and
            an optical device configured to collect light, via the opening, from the light source at the light collecting position;
    a rotor that is rotatable about a rotation axis, wherein the rotor comprises a wavelength conversion region that is on the light irradiation region, wherein the wavelength conversion region is configured to convert a wavelength of the light collected from the light source;
    a ventilation passage, wherein at least a part of the rotor is inside the ventilation passage; and
    a lens unit, wherein
        a part of the lens unit forms a part of a ventilation structure, and
        the ventilation structure forms the ventilation passage;
    a fan that is configured to supply cooling air to the ventilation passage;
    a light modulation element that is configured to modulate the light emitted from the wavelength conversion region of the rotor; and
    a projection optical system configured to project the modulated light.

* * * * *